US006423926B1

(12) United States Patent
Kelly

(10) Patent No.: US 6,423,926 B1
(45) Date of Patent: Jul. 23, 2002

(54) DIRECT-METAL-DEPOSITION (DMD) NOZZLE FAULT DETECTION USING TEMPERATURE MEASUREMENTS

(76) Inventor: Joseph K. Kelly, 44696 Helm St., Plymouth, MI (US) 48170

( * ) Notice: Subject to any disclaimer, the term of this patent is extended or adjusted under 35 U.S.C. 154(b) by 32 days.

(21) Appl. No.: 09/714,086

(22) Filed: Nov. 16, 2000

Related U.S. Application Data

(60) Provisional application No. 60/165,678, filed on Nov. 16, 2000.

(51) Int. Cl.[7] ........................... B23K 26/14; B23K 26/34
(52) U.S. Cl. .............................. 219/121.63; 219/121.84
(58) Field of Search ....................... 219/121.63, 121.64, 219/121.65, 121.66, 121.84, 121.47

(56) References Cited

U.S. PATENT DOCUMENTS

| 4,724,299 A | 2/1988 | Hemmeke ............... 219/121 L |
| 5,304,771 A | * 4/1994 | Griffin et al. .......... 219/121.63 |
| 5,961,862 A | * 10/1999 | Lewis et al. ........... 219/121.84 |
| 6,122,564 A | 9/2000 | Koch et al. .................. 700/123 |

FOREIGN PATENT DOCUMENTS

JP              02255288 A   * 10/1990 ............ 219/121.63

* cited by examiner

Primary Examiner—Samuel M. Heinrich
(74) Attorney, Agent, or Firm—Gifford, Krass, Groh, Sprinkle, Anderson & Citkowski, PC

(57) ABSTRACT

The temperature of the deposition tip in a direct metal deposition (DMD) apparatus is monitored to circumvent problems due to tip clogging. Both the inner and outer nozzle tips are monitored utilizing appropriate sensors, which are interconnected to a controller programmed to detect a predetermined rise in tip temperature. If an unacceptable condition is sensed, the equipment may be configured to sound an alarm, display a warning condition, or enter a controlled shut-down of the deposition apparatus. Use of the invention accordingly permits the detection of even partial clogging when it occurs, allowing an operator to take immediate corrective measures both to protect the nozzle from damage and to insure the highest possible deposition quality.

2 Claims, 1 Drawing Sheet

DIRECT-METAL-DEPOSITION (DMD) NOZZLE FAULT DETECTION USING TEMPERATURE MEASUREMENTS

REFERENCE TO RELATED APPLICATION

This application claims priority from U.S. provisional patent application Serial No. 60/165,678, filed Nov. 16, 2000, the entire contents of which are incorporated herein by reference.

FIELD OF THE INVENTION

This invention relates generally to additive manufacturing and, in particular, to nozzle configurations, and methods of use, in conjunction with laser-based direct metal deposition.

BACKGROUND OF THE INVENTION

As disclosed in commonly assigned U.S. Pat. No. 6,122,564, the entire contents of which are disclosed herein by reference, direct metal deposition (DMD™) is a laserbased fabrication process capable of producing near net-shape, fully dense molds, dies, and precision parts, as well as engineering changes or repairs to existing tooling or parts. According to the process, an industrial laser beam is focused onto a workpiece, creating a melt pool into which powdered metal is injected. The beam is moved under CNC control, based on a CAD geometry, tracing out the part, preferably on a layer-by-layer basis. Optical feedback is preferably used to maintain tight control over the process.

An integral part of the DMD process is the deposition nozzle used to deliver the metal powders to the melt pool. The nozzle must provide consistent and accurate control of the metal powder, which has a direct impact on the metallurgical properties, surface finish, and efficiency of the process. Existing nozzles for metal powder deposition or laser cladding have very low efficiencies, or catchment of powder being deposited. This results in excess powder on the workpiece, more frequent additions of powder in the storage devices, and higher costs. The efficiencies of laser based powder metallurgy nozzles are typically 15% efficient, meaning of the total volume of powder delivered to the melt pool only 15% of that powder is deposited.

A laser spray nozzle assembly is described in U.S. Pat. No. 4,724,299. The assembly includes a nozzle body with first and second spaced apart end portions. A housing, spaced from the second end portion, forms an annular passage. A cladding powder supply system is operably associated with the passage for supplying cladding powder thereto so that the powder exits the opening coaxial with a laser beam.

In operation, this nozzle has been found to exhibit a very low deposition efficiency. Other drawbacks include insufficient cooling through the nozzle (primarily the inner tip), powder supply and feed tubes which tend to be too restrictive and exposed to reflected laser beams, frequent clogging as the powder exits the nozzle towards the workpiece, no means of automated clog detection, and poor surface quality.

When the nozzle becomes clogged, the effect is to disturb the powder flow which, in many cases, results in non-uniform and poor delivery of powder to the laser beam. With a partially clogged nozzle, the feedback system may continue to trigger within an acceptable range, even though the bead characteristics may be flawed in any or all directions. For quality assurance and better hands-off reliability of the DMD process, the need therefore remains for a method of detecting nozzle clogging, preferably as soon as it occurs.

SUMMARY OF THE INVENTION

Broadly according to this invention, the temperature of the deposition tip in a direct metal deposition (DMD) apparatus is monitored to circumvent problems due to tip clogging. In the preferred embodiment, both the inner and outer nozzle tips are monitored utilizing thermocouples, which are interconnected to a controller programmed to detect a predetermined rise in tip temperature. If this condition is sensed, the equipment may be configured to sound an alarm, display a warning condition, or enter a controlled shut-down of the deposition apparatus. As such, use of the invention permits the detection of as even partial clogging when it occurs, allowing an operator to take immediate corrective measures both to protect the nozzle from damage and to insure the highest possible deposition quality.

DETAILED DESCRIPTION OF THE INVENTION

Figure 1:
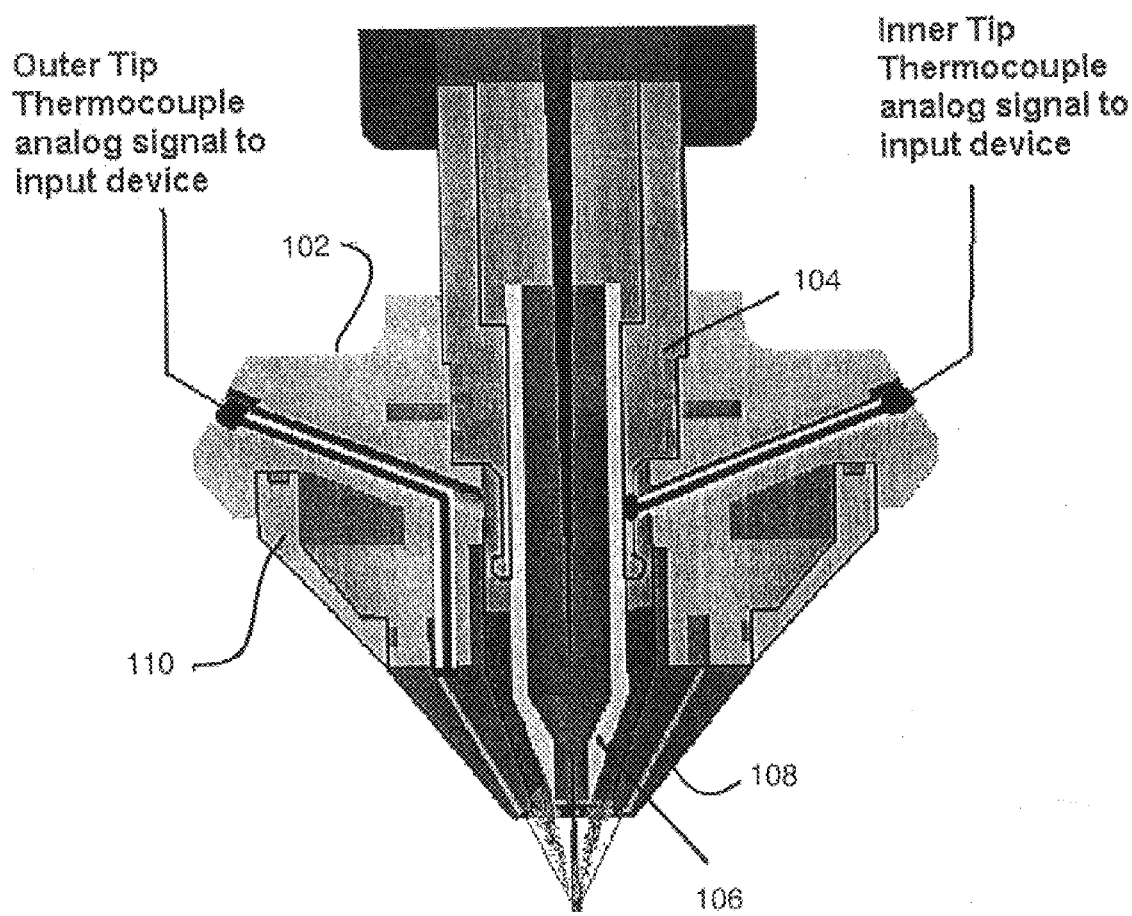
FIG. 1 is a cross-sectional view of a nozzle assembly to which this invention is applicable.

A nozzle assembly to which this invention is applicable is depicted in FIG. 1. The preferred embodiment includes five major components, as follows: a main body 102, inner tip housing 104, an inner tip 106, an outer shaping gas tip 108, and a cooling passage collar 110.

Clogging of the nozzle may arise for several reasons. As one example, powder melting from incident laser beam reflections from the worktable may back up into the nozzle. In addition, over-sized powder and/or contamination with foreign objects may be unable to fit though the gap between inner and outer nozzle tips.

Typically, nozzle clogging is due to the nozzle tip experiencing too high of an operating temperature. When this occurs, the metal powder being delivered through the nozzle, which flows along the tip, begins to sinter to the tip. Once a few particles sinter, or cling, to the wall of the tip, the powder starts to accumulate behind the powder which is sintered to the nozzle tip. The powder building up causes a disruption in powder flow, resulting in uneven, nonconcentric flow to the weld pool. The sintered powder is also exposed to reflected laser light, which can melt the sintered powder and also begin to melt the nozzle tip. With lower melting point materials, the clogging of the nozzle is more pronounced and more frequent.

A related problem is clipping of the laser beam on the nozzle inner lip. Through misalignment, sometimes the edge of the laser beam becomes incident on this nozzle component. As a result, the inner tip gets hotter, which is believed to contribute to nozzle clogging as well. This problem also blocks some of the laser beam power which would otherwise by absorbed by the workpiece.

The result in all such cases is a hotter nozzle, with inner and/or outer tips sharing the bulk the heat absorbed by the melted powder inside the nozzle. Therefore, by the method of this invention, the temperature of the nozzle tip, can also be useful in detecting clipping of the laser beam by the nozzle due to misalignment of nozzle and/or laser beam delivery.

In the preferred embodiment, the temperature of both the inner and outer nozzle tips is monitored utilizing thermocouples 120 and 130 depicted in FIG. 1. The thermocouples are interconnected to a controller (not shown), programmed to detect a predetermined rise in tip temperature. If this condition is sensed, the equipment may be configured to sound an alarm, display a warning condition, or enter a controlled shutdown of the deposition apparatus. As such, use of the invention permits the detection of even partial clogging when it occurs, allowing an operator to take immediate corrective measures both to protect the nozzle from damage and to insure the highest possible deposition quality.

I claim:

1. A nozzle assembly particularly suited to direct metal deposition, comprising:

a body having a central axis and a distal end terminating in a distal tip having inner and outer surfaces;

a laser beam aligned with the central axis and emerging past the inner surface of the distal tip;

a gas-carried powder feed path terminating in one or more powder outlets arranged in a first concentric ring surrounding the laser beam;

at least one sensor for detecting the temperature of the inner or outer surface of the distal tip; and control apparatus interconnected to the temperature sensor, the control apparatus being operative to perform a function if the sensed temperature exceeds a predetermined limit indicative of distal tip clogging or clipping of the laser beam.

2. The method of claim 1, wherein the function includes one, some or all of:

sounding an alarm displaying the sensed temperature; and terminating material deposition.

* * * * *